(12) United States Patent
Lee et al.

(10) Patent No.: US 8,498,353 B2
(45) Date of Patent: *Jul. 30, 2013

(54) APPARATUS AND METHOD FOR CYCLIC DELAY DIVERSITY IN MULTIPLE-ANTENNA WIRELESS COMMUNICATION SYSTEM

(75) Inventors: Jae-Hyok Lee, Suwon-si (KR); Jae-Ho Jeon, Seongnam-si (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,568

(22) Filed: May 31, 2012

(65) Prior Publication Data

US 2012/0236961 A1    Sep. 20, 2012

Related U.S. Application Data

(62) Division of application No. 12/002,848, filed on Dec. 18, 2007, now Pat. No. 8,204,141.

(30) Foreign Application Priority Data

Dec. 21, 2006   (KR) .............................. 2006-0131583

(51) Int. Cl.
*H04B 7/02* (2006.01)

(52) U.S. Cl.
USPC ........... 375/260; 375/267; 375/299; 375/340; 375/347; 455/101; 455/132; 455/296; 455/500; 455/562.1; 370/334; 370/464; 370/480

(58) Field of Classification Search
USPC .......... 375/260, 267, 299, 340, 347; 455/101, 455/132, 296, 500, 562.1; 370/334, 464, 370/480

See application file for complete search history.

(56) References Cited

U.S. PATENT DOCUMENTS

| | | | |
|---|---|---|---|
| 7,436,903 | B2 | 10/2008 | Sandhu et al. |
| 7,551,611 | B2 | 6/2009 | Nakao |
| 7,715,877 | B2 | 5/2010 | Nakao |
| 2005/0254592 | A1 | 11/2005 | Naguib et al. |
| 2006/0068698 | A1 | 3/2006 | Sandhu et al. |
| 2008/0039030 | A1 | 2/2008 | Khan et al. |
| 2008/0205533 | A1 | 8/2008 | Lee et al. |
| 2010/0061477 | A1 | 3/2010 | Lee et al. |

*Primary Examiner* — Leon Flores

(57) ABSTRACT

A cyclic delay diversity (CDD) technique in a multiple-antenna broadband wireless communication system is provided. An apparatus in the multiple-antenna broadband wireless communication system includes: a controller for selecting at least one sub-carrier to which CDD is applied; at least one shifter for shifting a phase of a signal mapped to the at least one selected sub-carrier; and an operator for converting the signal, which is mapped to the at least one selected sub-carrier and whose phase is shifted, and other signals mapped to the remaining sub-carriers into time-domain signals.

17 Claims, 4 Drawing Sheets

APPARATUS AND METHOD FOR CYCLIC DELAY DIVERSITY IN MULTIPLE-ANTENNA WIRELESS COMMUNICATION SYSTEM

CROSS-REFERENCE TO RELATED APPLICATION

The present application is a divisional patent application of U.S. patent application Ser. No. 12/002,848, filed Dec. 18, 2007 now U.S. Pat. No. 8,204,141, entitled "APPARATUS AND METHOD FOR CYCLIC DELAY DIVERSITY IN MULTIPLE-ANTENNA WIRELESS COMMUNICATION SYSTEM".

TECHNICAL FIELD OF THE INVENTION

The present invention relates to a multiple-antenna wireless communication system. More particularly, the present invention relates to an apparatus and method for performing cyclic delay diversity (ODD) in consideration of a multiple access in a multiple-antenna wireless communication system.

BACKGROUND OF THE INVENTION

A technique for utilizing a plurality of antennas is used as one method for performing high-speed communication. Examples of the technique include a multiple input, multiple output (MIMO) technique for performing communication by using a channel which spatially increases due to a plurality of antennas and a beam-forming (BF) technique for increasing a reception signal gain in a specific direction by applying phase and magnitude weights of the respective antennas.

In a communication system using a plurality of antennas, all of the antennas may transmit the same signals to obtain an antenna diversity effect. In this case, when a broadcasting message is transmitted for example, there is a high possibility that a shadow zone is generated as shown in FIG. 1. Referring to FIG. 1, a distance between a shadow zone 100 and a transmission (Tx) antenna 110 and a distance between the shadow zone 100 and a Tx antenna 120 is different by a half-wavelength (i.e., $\lambda/2$). When the antenna-A 100 and the antenna-B 120 transmit the same signals to a receiving end 130, the receiving end 130 located in the shadow zone 100 receives two signals having a phase difference of 180 degrees. The two signals are received in a superimposed manner rather than being separately received. As a result, the receiving end 130 receives a null signal in which the two signals are offset from each other.

In order for the receiving end 130 located in the shadow zone 100 to receive a signal, a cyclic delay diversity (CDD) is used. A structure of a transmitting end using the CDD is shown in FIG. 2.

FIG. 2 is a block diagram illustrating a structure of a transmitting end in a conventional multiple-antenna wireless communication system. Although a transmission path of only one antenna is shown in FIG. 2, transmission paths of the remaining antennas are the same as that shown in FIG. 2.

Referring to FIG. 2, the transmitting end includes an inverse fast Fourier transform (IFFT) operator 201, a symbol rotator 203, a cyclic prefix (CP) adder 205, a digital-to-analog converter (DAC) 207, and a radio frequency (RF) transmitter 209.

The IFFT operator 201 transforms signals, which are input in parallel as many as the number of sub-carriers, into time-domain Tx symbols by performing an IFFT operation.

The symbol rotator 203 cyclically shifts the Tx symbols, which are received from the IFFT operator 201, by as many as the number of corresponding samples in a time domain. The cyclic shift in the time domain has the same meaning as a phase shift in a frequency domain as expressed by Equation 1 below.

$$x(n) \Leftrightarrow X(k)$$
$$x(n-m) \Leftrightarrow X(k) \cdot e^{-j(2\pi km/N)} \qquad \text{[Eqn. 1]}$$

In Equation 1, the left term denotes a time-domain signal and the right term denotes a frequency-domain signal. In addition, $x(n)$ denotes an nth sample value in the time domain, $X(k)$ denotes a kth sub-carrier value in the frequency domain, m denotes the number of samples shifted in the time domain, and N denotes the number of times of performing the fast Fourier transform (FFT).

That is, the symbol rotator 203 shifts a phase of the Tx symbol so as to compensate for a relative phase variation in a receiving end.

The CP adder 205 receives the shifted Tx symbols from the symbol rotator 203 and then adds a cyclic prefix so as to prevent a multiple-path propagation delay. In other words, the CP adder 205 adds a copy of last parts of the Tx symbols to front parts of the Tx symbols. The DAC 207 receives a digital signal from the CP adder 205 and converts the digital signal into an analog signal. The RF transmitter 209 receives a baseband signal from the DAC 207, converts and amplifies the baseband signal into an RF signal, and transmits the RF signal through an antenna.

According to the aforementioned structure, the transmitting end of the multiple-antenna communication system can prevent the generation of a shadow zone. In this case, if the cyclic shift in the time domain is performed as described above, phases of signals for all sub-carriers are shifted. If the communication system is a system capable of supporting multiple access, such as, an Orthogonal Frequency Division Multiple Access (OFDMA) system, one symbol is divided by the unit of sub-carrier and then is used by a plurality of receiving ends. That is, a receiving end that requires the cyclic delay diversity and a receiving end that does not require the cyclic delay diversity can simultaneously perform communication by using one symbol. For example, if there is a receiving end that uses a multiple-antenna scheme (e.g., space time coding, spatial multiplexing, etc.), a transmitting end that uses the cyclic delay diversity shifts a phase of a signal for a sub-carrier to which the cyclic delay diversity is not applied. As a result, throughput deterioration may occur in the receiving end when receiving a signal. Accordingly, there is a need for a cyclic delay diversity technique suitable for the multiple access communication system.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and method in which a cyclic delay diversity (CDD) is applied in a sub-carrier selective manner in a multiple-antenna wireless communication system.

Another aspect of the present invention is to provide an apparatus and method in which a CDD is selectively applied to a user which does not use a multiple-antenna scheme in a multiple-antenna wireless communication system.

Another aspect of the present invention is to provide an apparatus and method for applying a CDD in a frequency domain in a multiple-antenna wireless communication system.

According to an aspect of the present invention, an apparatus for transmitting a signal in a multiple-antenna broadband wireless communication system is provided. The apparatus includes: a controller for selecting at least one sub-carrier to which CDD is applied; at least one shifter for shifting a phase of a signal mapped to the at least one selected sub-carrier; and an operator for converting the signal, which is mapped to the at least one selected sub-carrier and whose phase is shifted, and other signals mapped to the remaining sub-carriers into time-domain signals.

According to another aspect of the present invention, a method of transmitting a signal in a multiple-antenna broadband wireless communication system is provided. The method includes: selecting at least one sub-carrier to which a CDD is applied; shifting a phase of a signal mapped to the at least one selected sub-carrier; and converting the signal, which is mapped to the at least one selected sub-carrier and whose phase is shifted, and other signals mapped to the remaining sub-carriers into time-domain signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
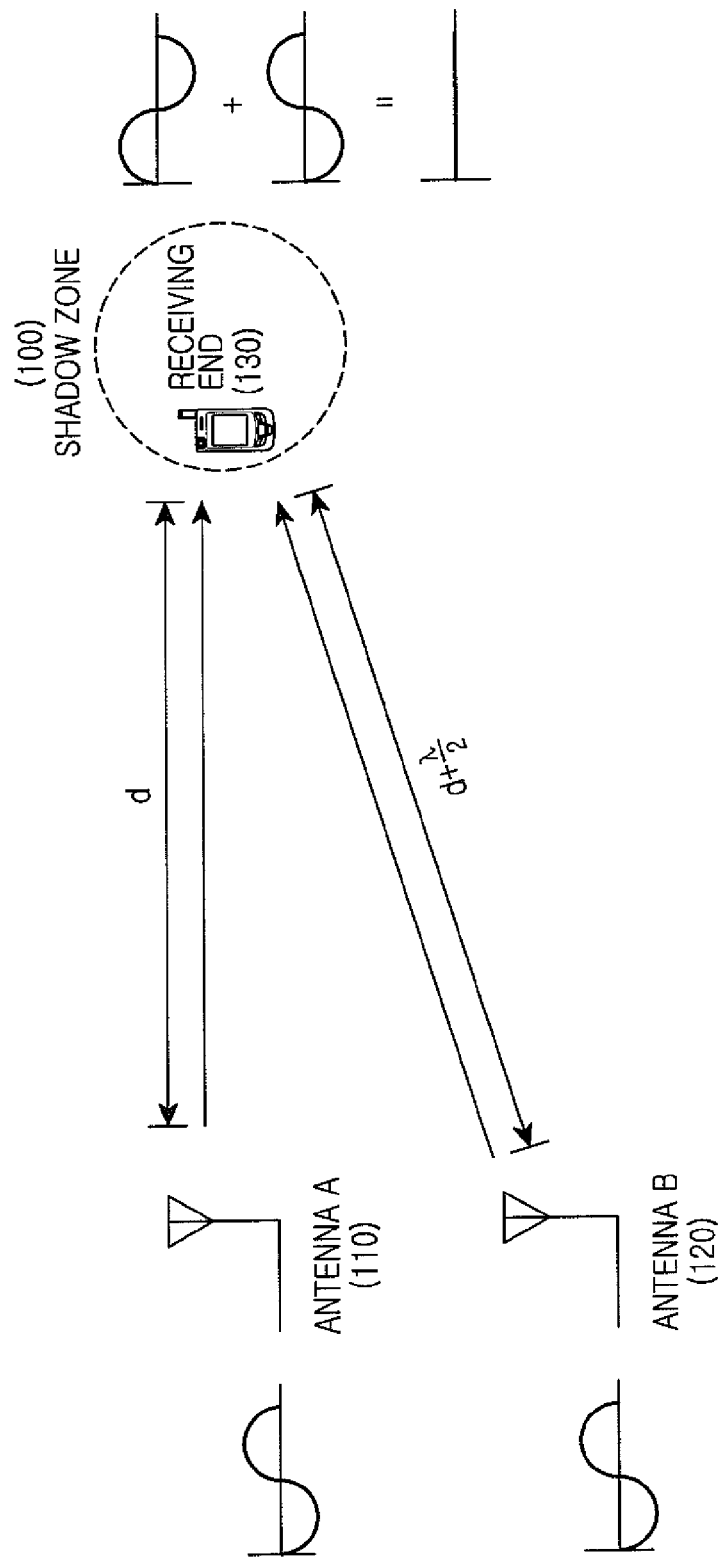
FIG. 1 illustrates a shadow zone generated when an antenna diversity is performed in a multiple-antenna wireless communication system.
Figure 2:
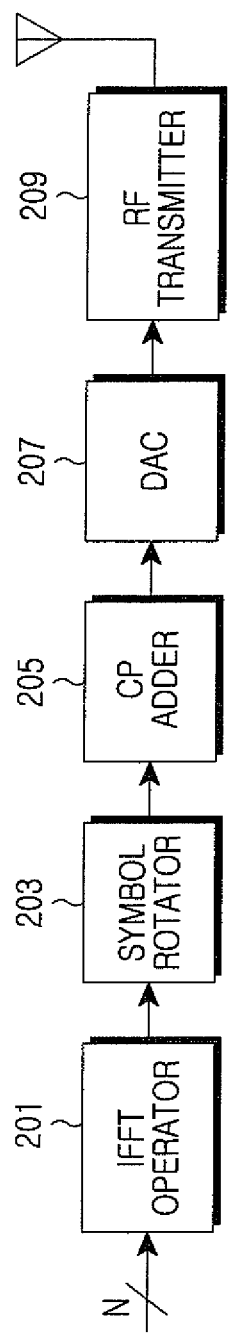
FIG. 2 is a block diagram illustrating a structure of a transmitting end in a conventional multiple-antenna wireless communication system.
Figure 3:
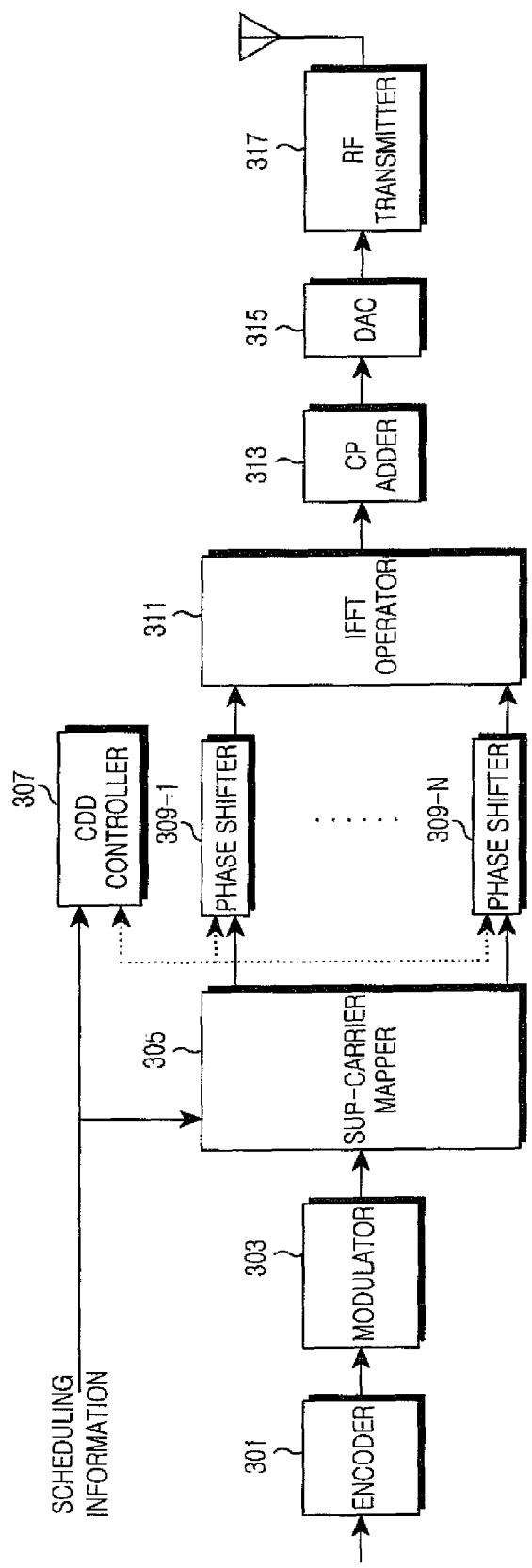
FIG. 3 is a block diagram illustrating a structure of a transmitting end in a multiple-antenna wireless communication system according to the present invention.
Figure 4:
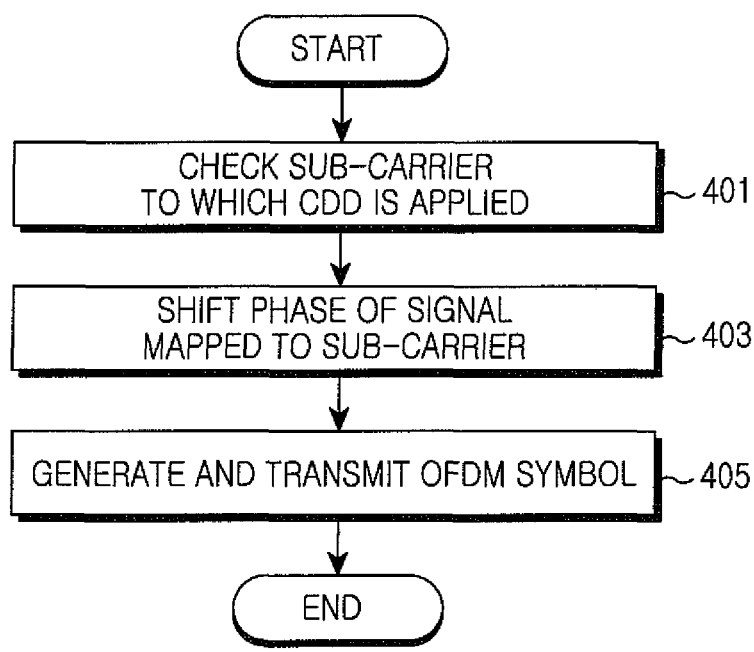
FIG. 4 is a flowchart illustrating a signal transmission process performed by a transmitting end in a multiple-antenna wireless communication system according to the present invention.

FIGS. 3 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a technique of the present invention will be described in which a cyclic delay diversity (CDD) is applied in a sub-carrier selective manner in a multiple-antenna broadband wireless communication system. The present invention will be explained by taking an example of an Orthogonal Frequency Division Multiple Access (OFDMA)-based system. However, the present invention may also apply to other systems as long as the systems are based on a multiple sub-carrier technique and a multiple access technique.

FIG. 3 is a block diagram illustrating a structure of a transmitting end in a multiple-antenna wireless communication system according to the present invention. Although a transmission path of only one antenna is shown in FIG. 3, transmission paths of a plurality of antennas each have the same configuration as that shown in FIG. 3.

Referring to FIG. 3, the transmitting end includes an encoder 301, a modulator 303, a sub-carrier mapper 305, a cyclic delay diversity (CDD) controller 307, a plurality of phase shifters 309-1 to 309-N, an inverse fast Fourier transform (IFFT) operator 311, a cyclic prefix (CP) adder 313, a digital-to-analog converter (DAC) 315, and a radio frequency (RF) transmitter 317.

The encoder 301 encodes a bit-stream according to a specific encoding method. The modulator 303 receives the encoded bit-stream from the encoder 301 and transforms the bit-stream into a complex symbol according to a specific constellation. The sub-carrier mapper 305 maps the complex symbol, which is received from the modulator 303, to a corresponding sub-carrier according to scheduling information.

According to the scheduling information, the CDD controller 307 selects sub-carriers allocated to a receiving end that requires the cyclic delay diversity, and controls at least one phase shifter 309 such that a phase of a signal transmitted through the sub-carriers is shifted. For example, the CDD controller 307 selects a sub-carrier, to which beam-forming is not applied, as a sub-carrier to which the CDD scheme is applied. In this case, the CDD controller 307 provides the phase shifter 309 with a phase magnitude to be shifted with respect to a corresponding sub-carrier. The phase magnitude may be obtained by referencing a table which is pre-determined and stored. In addition, the phase magnitude may be obtained by calculating a cyclic delay according to the number of time-domain samples. When the phase magnitude is obtained through calculation, the phase magnitude can be computed by using Equation 2 below.

$$\theta_k = \frac{2\pi km}{N} \quad \text{[Eqn. 2]}$$

In Equation 2, $\theta_k$ denotes a phase shift value for a $k^{th}$ sub-carrier, m denotes the number of time-domain samples which require a cyclic delay, and N denotes an IFFT size, that is, the number of sub-carriers.

The phase shifters 309-1 to 309-N are located for all paths of the respective sub-carriers and thus shift phases of signals for corresponding sub-carriers under the control of the CDD controller 307. That is, the phase shifters 309-1 to 309-N shift the phases of the signals which are mapped to the sub-carriers so that a relative phase difference can be compensated for in a shadow zone.

The IFFT operator 311 transforms signals, which are input in parallel as many as the number of sub-carriers, into time-domain OFDM symbols by performing an IFFT operation. The CP adder 313 receives the OFDM symbols from the IFFT operator 303 and then adds a cyclic prefix (CP) so as to prevent a multiple-path propagation delay. In other words, the CP adder 313 adds a copy of last parts of the symbols to front parts of the symbols. The DAC 315 receives a digital signal from the CP adder 313 and converts the digital signal into an analog signal. The RF transmitter 317 receives a baseband signal from the DAC 315, converts and amplifies the baseband signal into an RF signal, and transmits the RF signal through an antenna.

In the aforementioned structure, the phase shifter 309 exists as many as the number of sub-carriers and shifts a phase of a signal mapped to each sub-carrier. However, in a practical implementation, the phase shifters 309-1 to 309-N may be composed of one block including a plurality of input terminals and a plurality of output terminals.

FIG. 4 is a flowchart illustrating a signal transmission process performed by a transmitting end in a multiple-antenna wireless communication system according to the present invention.

Referring to FIG. 4, a sub-carrier to which the cyclic delay diversity is applied is selected in step 401. For example, a sub-carrier, to which beam-forming is not applied, may be selected as the sub-carrier to which the cyclic delay diversity is applied. That is, the transmitting end uses scheduling information to check a sub-carrier assigned to a receiving end that requires the cyclic delay diversity.

In step 403, a phase of a signal mapped to the checked sub-carrier is shifted. That is, the transmitting end shifts the phase of the signal mapped to the sub-carrier so that a relative phase variation can be compensated for in the receiving end. A magnitude of the phase to be shifted may be obtained by referencing a table which is pre-determined and stored. In addition, the phase magnitude may be obtained by calculating a cyclic delay according to the number of time-domain samples. When the phase magnitude is obtained through calculation, the phase magnitude can be computed by using Equation 2 above.

In step 405, an OFDM symbol is generated by performing an IFFT operation, is then subjected to a CP addition, analog conversion, and RF conversion, and is then transmitted through an antenna.

According to the present invention, a cyclic delay diversity is applied in a sub-carrier selective manner in a multiple-antenna broadband wireless communication system. As a result, throughput deterioration can be prevented in a redeiving end that does not require the cyclic delay diversity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for transmitting a signal in a multiple-antenna wireless communication system, the apparatus comprising:
a controller implemented at least partially in hardware, the controller configured to select at least one sub-carrier assigned to at least one receiving end to which beam-forming is not applied as the at least one selected sub-carrier to which a cyclic delay diversity is applied, and determine a phase shift value by using a stored table;
at least one mapper configured to map modulated symbols to sub-carriers;
at least one shifter configured to shift a phase of a signal mapped to the at least one selected sub-carrier among the sub-carriers by the phase shift value; and
an operator configured to convert the signal, which is mapped to the at least one selected sub-carrier and whose phase is shifted by the phase shift value, and other signals mapped to the remaining sub-carriers into time-domain signals.

2. The apparatus of claim 1, wherein the controller is further configured to provide the phase shift value to the at least one shifter.

3. The apparatus of claim 2, wherein the phase shift value is determined according to the equation:

$$\theta_k = \frac{2\pi km}{N},$$

where $\theta_k$ denotes a phase shift value for a $k^{th}$ sub-carrier, m denotes the number of time-domain samples which require a cyclic delay, and N denotes an inverse fast Fourier transform (IFFT) size, that is, the number of sub-carriers.

4. The apparatus of claim 1, wherein the phase shift value is determined based on at least one of the sub-carrier index, a number of time-domain samples that require a cyclic delay and a number of sub-carriers.

5. The apparatus of claim 1, wherein the at least one shifter exists as many as the total number of sub-carriers.

6. The apparatus of claim 1, wherein the operator is configured to convert the signals mapped to the sub-carriers into Orthogonal Frequency Division Multiplexing (OFDM) symbols by performing an IFFT operation.

7. The apparatus of claim 6, further comprising:
an adder configured to add a cyclic prefix to the OFDM symbol;
a converter configured to convert the OFDM symbol added with the cyclic prefix into an analog signal; and
a transmitter configured to convert the analog signal into a radio frequency (RF) signal and to transmit the RF signal through an antenna.

8. A method of transmitting a signal in a multiple-antenna wireless communication system, the method comprising:
selecting, using a controller implemented at least partially in hardware, at least one sub-carrier assigned to at least one receiving end, to which beam-forming is not applied, as the at least one sub-carrier to which a cyclic delay diversity is applied;
determining a phase shift value by using a stored table;
mapping modulated symbols to sub-carriers;
shifting a phase of a signal mapped to the at least one selected sub-carrier among the sub-carries by the phase shift value; and
converting the signal, which is mapped to the at least one selected sub-carrier and whose phase is shifted by the phase shift value, and other signals mapped to the remaining sub-carriers into time-domain signals.

9. The method of claim 8, further comprising:
determining the phase shift value for the signal mapped to the selected sub-carrier.

10. The method of claim 9, wherein the phase shift value is determined according to the equation:

$$\theta_k = \frac{2\pi km}{N},$$

where $\theta_k$ denotes a phase shift value for a $k^{th}$ sub-carrier, m denotes the number of time-domain samples which require a cyclic delay, and N denotes an inverse fast Fourier transform (IFFT) size, that is, the number of sub-carriers.

11. The method of claim 8, wherein the phase shift value is determined based on at least one of the sub-carrier index, a number of time-domain samples that require a cyclic delay and a number of sub-carriers.

12. The method of claim 8, wherein converting the signals into time-domain signals comprises converting the signals into Orthogonal Frequency Division Multiplexing (OFDM) symbols by performing an IFFT operation.

13. The method of claim 12, further comprising:
adding a cyclic prefix to the OFDM symbol;
converting the OFDM symbol added with the cyclic prefix into an analog signal; and
converting the analog signal into a radio frequency (RF) signal and transmitting the RF signal through an antenna.

14. An apparatus for transmitting a signal in a multiple-antenna wireless communication system, the apparatus comprising:
a controller implemented at least partially in hardware, the controller configured to use scheduling information to determine whether a sub-carrier is assigned to a receiving end that requires cyclic delay diversity, the receiving end that requires cyclic delay diversity comprising a receiving end to which beam-forming is not applied, and determine a phase shift value by using a stored table; and
at least one mapper configured to map modulated symbols to sub-carriers;
a shifter configured to shift a phase of a signal mapped to the sub-carrier of the sub-carriers by the phase shift value when the sub-carrier is determined to be assigned to a receiving end that requires cyclic delay diversity.

15. The apparatus of claim 14, wherein the controller is further configured to provide the phase shift value to the at least one shifter.

16. The apparatus of claim 15, wherein the phase shift value is determined according to the equation:

$$\theta_k = \frac{2\pi km}{N},$$

where $\theta_k$ denotes a phase shift value for a $k^{th}$ sub-carrier, m denotes the number of time-domain samples which require a cyclic delay, and N denotes an inverse fast Fourier transform (IFFT) size, that is, the number of sub-carriers.

17. The apparatus of claim 14, wherein the apparatus further comprises an operator is configured to convert the signals mapped to the sub-carrier into Orthogonal Frequency Division Multiplexing (OFDM) symbols by performing an IFFT operation.

* * * * *